3,232,948
MIXED AZINES OF N-SUBSTITUTED 4-PIPER-
IDONES AND DIARYL KETONES
Harman S. Lowrie, Glenview, Ill., assignor to G. D.
Searle & Co., Chicago, Ill., a corporation of Delaware
No Drawing. Filed June 28, 1963, Ser. No. 291,263
7 Claims. (Cl. 260—293)

The present invention relates to mixed azines of N-substituted 4-piperidones and diaryl ketones. More particularly, it relates to a group of compounds which can be represented by the following general formula

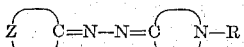

wherein

is selected from the group consisting of fluoren-9-ylidene, xanthen-9-ylidene, chloroxanthen-9-ylidene, thioxanthen-9-ylidene, chloro-thioxanthen-9-ylidene, and

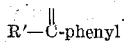

wherein R' is selected from the group consisting of phenyl, halophenyl, tolyl, and pyridyl; R is selected from the group consisting of lower alkyl and benzyl; and

is selected from the group consisting of

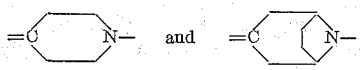

The halophenyl radicals referred to above include fluorophenyl, chlorophenyl, bromophenyl, and iodophenyl. The lower alkyl radicals referred to above contain up to 6 carbon atoms and can be exemplified by methyl, ethyl, propyl, butyl, hexyl, and the like.

The organic bases of this invention form pharmaceutically acceptable salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

To prepare the compounds of the present invention, the hydrazone of an appropriate diaryl ketone is heated with the appropriate 1-substituted 4-piperidone in an inert solvent and in the presence of a trace of acid. It is advantageous to carry out the reaction in such a manner as to remove water from the reaction mixture as it is formed.

The compounds of this invention possess valuable pharmacological properties. In particular, they are pepsin-inhibitors and anti-ulcer agents. The latter activity is demonstrated by their inhibition of ulceration in the Shay rat. They are also inhibitors of hepatic cholesterol synthesis. In addition, they are anti-bacterial and anti-algal agents as is demonstrated by their inhibition of the growth of the organisms *Diplococcus pneumoniae* and *Chlorella vulgaris*. They also inhibit germination of seeds of trifolium.

The following examples are presented to further illustrate the invention; they should not be construed as limiting it in spirit or in scope. Quantities are indicated in parts by weight and temperatures in degrees centigrade (° C.).

*Example 1*

A mixture of 40 parts of benzophenone hydrazone, 30.5 parts of 1-methyl-4-piperidone, 1 part of acetic acid and 560 parts of Skellysolve L (a mixture of hydrocarbons, essentially octanes, boiling at about 91–126° C.) is refluxed in an apparatus which is equipped with a water separator trap. After heating for 30 minutes, no additional water is collected in the trap so that heating is discontinued.

The solution is decanted from a small amount of tar and the solvent is evaporated from the solution under reduced pressure. The residual material is an oil which is stirred with about 65 parts of pentane to cause it to crystallize. The crystals are separated, dried, and recrystallized from hexane to give yellow prisms melting at about 99–100° C. This product is benzophenone azine with 1-methyl-4-piperidone and it has the formula

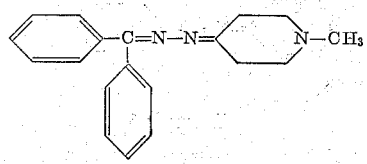

*Example 2*

If an equivalent quantity of 1-ethyl-4-piperidone is substituted for the 1-methyl-4-piperidone and the procedure of Example 1 is repeated, the produce is benzophenone azine with 1-ethyl-4-piperidone.

Likewise, if an equivalent quantity of 1-benzyl - 4-piperidone is used in place of the 1-methyl-4-piperidone, the product is benzophenone azine with 1-benzyl-4-piperidone melting at about 112–113° C. This compound has the following formula

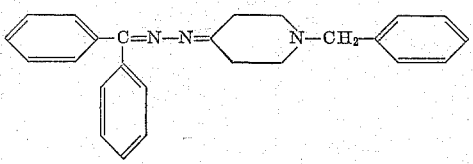

*Example 3*

An equivalent quantity of an appropriately substituted benzophenone is substituted for the benzophenone and the procedure of Example 1 is repeated. In this way, 4 - chlorobenzophenone hydrazone gives 4 - chlorobenzophenone azine with 1-methyl-4-piperidone as an orange oil. In a similar manner 2-chlorobenzophenone azine with 1-methyl-4-piperidone, 4-fluorobenzophenone azine with 1 - methyl - 4 - piperidine, 4 - iodobenzophenone azine with 1-methyl-4-piperidone, and 4-methylbenzophenone azine with 1-methyl-4-piperidone are obtained from the reaction of the appropriately substituted benzophenone hydrazone and 1-methyl-4-piperidone.

*Example 4*

A mixture of 40 parts of 4-benzoylpyridine hydrazone, 30.5 parts of 1-methyl-4-piperidone, 12 parts of acetic acid and 560 parts of Skellysolve L is refluxed in an apparatus equipped with a water trap until no more water separates from the reaction mixture. The reaction mixture is then cooled, diluted with ether, and washed with dilute potassium carbonate solution. The ether solution is then dried and the solvent is evaporated to leave a residual oil which crystallizes when mixed with pentane. The resultant solid is then recrystallized twice from pentane to give 4-benzoylpyridine azine with 1- methyl-4-piperidone as yellow clusters melting at about 78–80% C. This compound has the following formula

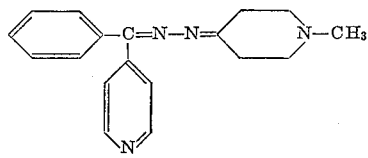

*Example 5*

The procedure of Example 1 is repeated but an equivalent quantity of an appropriate cyclic ketone hydrazone is substituted for the benzophenone hydrazone. Thus, fluorenone hydrazone reacts with 1-methyl-4-piperidone to give fluorenone azine with 1-methyl-4-piperidone melting at about 90–92° C.; 9-xanthenone hydrazone reacts with 1-methyl-4-piperidone to give 9-xanthenone azine with 1-methyl-4-piperidone melting at about 108–110° C.; and 9-thioxanthenone hydrazone reacts with 1-methyl-4-piperidone to give 9-thioxanthenone azine with 1-methyl-4-piperidone. The last compound has the following formula

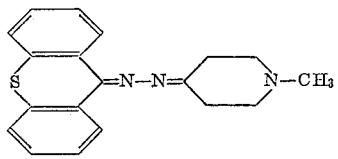

*Example 6*

30 parts of benzophenone hydrazone, 37 parts of 3-tropanone, 1 part of acetic acid and 560 parts of Skellysolve L is refluxed until no more water collects in the water trap. The reaction mixture is cooled, the organic solution is separated and the solvent is evaporated from the solution under reduced pressure. The residual material is an orange oil which crystallizes after standing for several days. The product thus obtained is benzophenone azine with 3-tropanone and it has the following formula

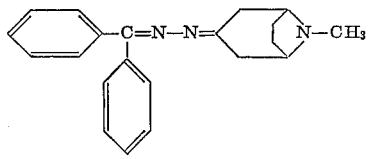

*Example 7*

A mixture of 5.8 parts of benzophenone azine with 1-methyl-4-piperidone and 3.1 parts of methyl iodide is dissolved in 130 parts of dry benzene and allowed to stand at room temperature. A solid starts to crystallize from the solution approximately 5 minutes after the materials are mixed. However, the mixture is allowed to stand for 15 hours before the crystals are separated by filtration, dried, and recrystallized from ethanol. The product thus obtained is benzophenone azine with 1-methyl-4-piperidone methiodide melting at about 175–176° C. with decomposition. This compound has the following formula

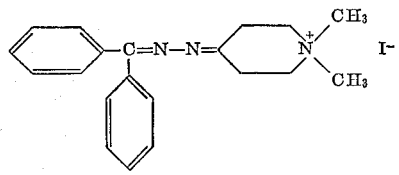

What is claimed is:
1. A compound of the formula

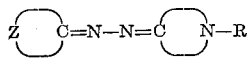

wherein

is selected from the group consisting of fluoren-9-ylidene, xanthen-9-ylidene, thioxanthen-9-ylidene, and

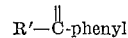

wherein R' is selected from the group consisting of phenyl, halophenyl, tolyl, and pyridyl; R is selected from the group consisting of lower alkyl and benzyl; and

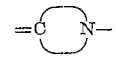

is selected from the group consisting of

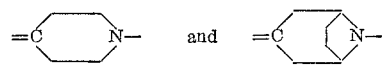

2. A compound of the formula

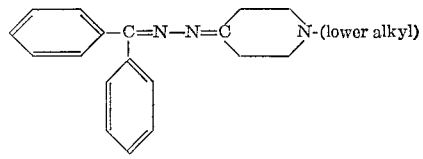

3. A compound of the formula

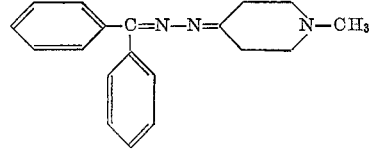

4. A compound of the formula

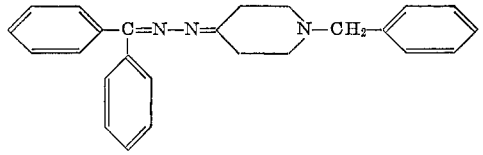

5. A compound of the formula

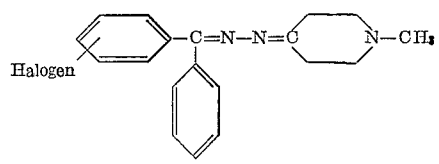

6. A compound of the formula

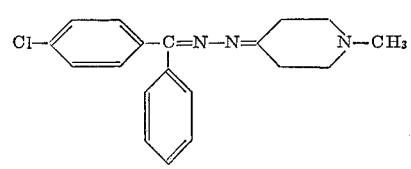

7. A compound of the formula

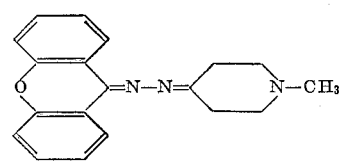

References Cited by the Examiner
UNITED STATES PATENTS
2,830,050    4/1958    Biel _____ 260—293

WALTER A. MODANCE, *Primary Examiner.*

NICHOLAS S. RIZZO, *Examiner.*